United States Patent [19]
Rizzotto et al.

[11] Patent Number: 5,633,986
[45] Date of Patent: May 27, 1997

[54] METHOD FOR SETTING UP MEMORIES OF A FUZZY ELECTRONIC CONTROLLER

[75] Inventors: Gianguido Rizzotto, Civate; Rinaldo Poluzzi, Piazza Istriaz; Andrea Pagni, Milan, all of Italy

[73] Assignee: SGS-Thomson Microelectronics S.r.l., Agrate Brianza, Italy

[21] Appl. No.: 563,788

[22] Filed: Nov. 27, 1995

Related U.S. Application Data

[63] Continuation of Ser. No. 983,802, Nov. 24, 1992, abandoned.

[30] Foreign Application Priority Data

Nov. 27, 1991 [IT] Italy ................... MI91A3167

[51] Int. Cl.$^6$ .................................................. G06F 9/44
[52] U.S. Cl. .................................... 395/3; 395/900
[58] Field of Search ........................ 395/3, 61, 51

[56] References Cited

U.S. PATENT DOCUMENTS

| | | | |
|---|---|---|---|
| 4,961,225 | 10/1990 | Hisano | 395/61 |
| 5,149,472 | 9/1992 | Suganuma | 395/900 |
| 5,201,336 | 4/1993 | Nakano | 395/900 |
| 5,243,687 | 9/1993 | Ando et al. | 395/3 |
| 5,261,036 | 11/1993 | Nakano | 395/900 |
| 5,299,283 | 3/1994 | Hamamoto | 395/3 |

FOREIGN PATENT DOCUMENTS

| | | |
|---|---|---|
| 89117778 | 9/1989 | European Pat. Off. . |
| 90106933 | 4/1990 | European Pat. Off. . |
| 0361403 | 4/1990 | European Pat. Off. . |
| 0372509 | 6/1990 | European Pat. Off. . |
| 0392494 | 10/1990 | European Pat. Off. . |
| 90120340 | 10/1990 | European Pat. Off. . |

OTHER PUBLICATIONS

Proceedings of the Twentieth International Symposium in Multiple–Value Logic, May, 1990, Charlotte, US, pp. 394–400, Li Zhijian, Jiang Hong, "A CMOS Current–Mode High Speed Fuzzy Logic Microprocessor for a Real Time Expert System".

Microprocessing and Microprogramming, vol. 24, No. 1–5, Aug., 1988, Amsterdam, NL, pp. 647–654, E.L. Zapata, et al, "A VSLI Systolic Architecture for Fuzzy Clustering".

European Search Report from Italian Patent Application MI91A003167, filed Nov. 27, 1991.

Watonabe, et al., "VLSI Fuzzy Chip and Inference Accelerator Board Systems" Proc. 21st Int'l Symposium on Multiple Valued Logic, May 26–29, 1991, pp. 120–127.

M. Togai and H. Watanabe, "Expert System on a Chip: An Engine for Real Time Approximate Reasoning" IEEE Expert, (Fall 1986), pp. 55–62.

M. Togai and S. Chiu, "A Fuzzy Logic Chip and a Fuzzy Inference Accelerator for Real–Time Approximate Reasoning", Proc. 17th Int's. Sym. Multiple Valued Logic, (May 1987), pp. 25–29.

*Primary Examiner*—Robert W. Downs
*Attorney, Agent, or Firm*—Wolf, Greenfield & Sacks, P.C.; James H. Morris; Brett N. Dorny

[57] ABSTRACT

An architecture for an electronic controller operated using fuzzy logic, including an input section with a plurality of inputs for analog or digital signals, a central control unit provided with memories wherein fuzzy logic membership functions are stored) and a defuzzyfier section has its input section composed of a plurality of fuzzyfiers arranged in parallel and independent of one another, each fuzzyfier including an analog input and a digital input for receving signals from external sensors, and digital outputs connected to the input of a corresponding read-only memory of the central unit to select the address of a memory word.

Membership functions are stored and retrieved from a memory according to a method which simplifies addressing and reduces the number of required accesses.

7 Claims, 10 Drawing Sheets

METHOD FOR SETTING UP MEMORIES OF A FUZZY ELECTRONIC CONTROLLER

This application is a continuation of application Ser. No. 07/983,802, filed Nov. 24, 1992 now abandoned.

DESCRIPTION

1. Field of the Invention

This invention relates to an architecture and a method of setting up the memory of an electronic controller operated using fuzzy logic.

More particularly, the invention relates to an architecture for a fuzzy logic electronic controller of a kind which comprises an input section having a plurality of inputs for analog or digital signals, a central control unit provided with memories having fuzzy logic membership functions stored therein, and a defuzzifyer section.

The invention also relates to a method of setting up a memory for an electronic controller operated on fuzzy logic, whereby predetermined membership functions μ(x) of logic variables (X) are subjected to inference operations configured essentially as IF-THEN rules with at least one front preposition and at least one rear implication.

The field of application of this invention pertains to the development of artificial intelligence and in particular to electronic data processing means based on a logic of the so-called fuzzy type.

2. Discussion of the Related Art

Fuzzy logic is winning acceptance as a technique that can provide solutions to a wide range of control problems wherein conventional techniques have proved unable to provide solutions at an acceptable cost-to-performance ratio.

Heretofore, however, fuzzy logic applications have suffered limitations due to the lack of dedicated computation devices. This limitation result from the fact that conventional electronic means, based on totally different information handling techniques and concepts, hardly suit effective operation in the fuzzy computation mode.

For a better understanding of the invention, the two main methods of representing and modelling reality, or, stated otherwise, the terms of a given problem to be solved, are reviewed first. Specifically, these are the methods which are commonly employed to find a solution to problems through the use of electronic computation instruments.

A first method provides a numerical/analytical description of reality, and is widely used for scientific and engineering applications wherever all the terms of a problem to be solved can be effectively identified. This method has greatly influenced the architecture of current data processing arrangements, but hardly suits cases where the aspects of a problem are presented in "hazy" forms, i.e. difficult to identify, as in, for example, applications related to artificial intelligence.

In such circumstances a modelling technique that can provide a quantitative/qualitative description of the problem awaiting solution has been shown to be more effective. Fuzzy logic provides a body of rules for handling those sets of problems which present themselves in uncertain and imprecise frames as are typical of most human activities. In other words, fuzzy logic provides a method of modelling the "vague" mental processes typical of human reasoning, which processes play, however, a vital role in the very capability of humans to make decisions under conditions of uncertainty.

More specifically, fuzzy logic operates on a linguistic description of reality using a particular class of variables, referred to as language variables and designated X, whose values may include, for example, words or statements in any natural or artificial languages. In other words, each variable is assigned a semantic meaning corresponding to the words or statements used at the modelling stage of a given problem.

Further, each variable may be associated syntactically with a set of values that are dependent on the variable and capable of taking on different meanings according to the context in which they are used. Such values are obtained from a primary term which represents the variable, an antonym thereof, and a series of so-called primary term modifiers.

Let us assume, by way of example, that the "temperature" name or notion be defined as a language variable X; also, let us select, for the primary term of the X variable, the word "cold" and define "hot" as its antonym.

With the primary term, there may also be associated a series of modifiers, such as "not", "very", "less", etc. which complete the set of values of the variable, even if in a non-univocal or uncertain way, but adequate for the purposes of fuzzy logic.

Moreover, each value assigned to a language variable is represented by a so-called "fuzzy set", that is a stochastic distribution function which ties each value of the variable to a definition domain understood as the universe of discourse.

Those functions which identify a fuzzy set in the universe of discourse of a variable are referred to as membership functions μ(x), and it is through them that appropriate operations are performed which define the fuzzy computation.

The aggregate of all the fuzzy sets of a language variable is called a term set.

Merely as an example, FIG. 1 herein is a plotting which summarizes graphically the concepts set forth above.

In this Figure, the axis of abscissae is the axis of the universe of discourse {x} of the language variable X=TEMPERATURE, and the axis of ordinates is the axis of the degrees of the membership functions μ(x) associated with that variable.

The Figure shows several memberships functions for the set of values dependent on the selected language variable X, such as: μc(x) representative of the membership function of the primary term COLD, μh(x) that of the antonym HOT, μnc(x) that of the modified term NOT COLD, and so forth.

Two different types of representations are possible for the membership functions: analytical and vectorial.

The former is a function of the universe of discourse and enables so-called "mapping" of that universe within a 0–1 range of values.

The latter is a vectorial sample representation of the membership function μ(x) which is obtained by splitting the universe of discourse into N segments, and the [0,1] range into L levels.

Between the membership functions, logic operations, known as inference operations, may be performed as explained hereinafter.

Meanwhile, it is important to observe that the electronic data processing arrangement used to carry out such operations is preferably a specific architecture dedicated to the body of inference operations that make up the computational model in fuzzy logic.

A dedicated fuzzy computation arrangement can currently be currently implemented using two different technologies: a so-called hybrid or analog/digital technology, and a digital technology.

The choice of either technology strongly affects the representation types by which the membership functions can be formalized.

Basically, with a hybrid technology, membership functions can only be represented in a vectorial way, and the vector components are voltage and/or current values representing so-called levels of truth.

The vertical space is then segmented into an L number of levels according to requirements, while the universe of discourse is determined at the designing stage.

This technology has been developed by the FLSI (Fuzzy Logic System Institute) headed by Professor Yamakawa, and is described, for instance, in a publication entitled "Intrinsic Fuzzy Electronic Circuits for Sixth Generation Computer", published by M. M. Gupta & T. Yamakawa in 1988.

By contrast, the digital technology allows representation of the membership functions in both vectorial and analytical forms.

In the instance of analytical representation, there are two formalization methods, one of which includes providing just some notable points of a function, specifically those where the function changes its gradient.

The fuzzy device is delegated to join such points in order to allow the fuzzy computation proper to be carried out.

An example of that device is provided by a machine from OMRON Corporation designated FP-3000 for which an operation manual entitled "Digital Fuzzy Processor-Controller Series" is available.

Among the benefits of this approach is the high precision with which the membership domain of the various functions can be segmented both in the horizontal plane and the vertical plane.

But there are some disadvantages as well, originating from the low flexibility afforded in describing the membership functions.

For example, in the above case, there can be just four inflection points at most, which must of necessity carry truth values of 0 or 1.

The second-mentioned method of formalizing the analytical approach includes providing the equations that describe the membership function in its domain.

In this case, higher flexibility is achieved in the definition of such functions.

However, with either of these analytical methods, the fuzzy computation is carried out by a purely numerical approach, which has very unfavorable effects at the computation level.

Considering now the digital technology which uses vectorial representation of the membership functions, it is primarily distinguished by the fact that the vertical axis representation of a given level of truth involves, by necessity, the use of a number of bits dependent on the target degree of accuracy.

The advantages of this technology most definitely include extreme computational simplicity in carrying out the fuzzy inference computations.

An example of such an embodiment is described in an article "A VLSI Fuzzy Logic Controller with Reconfigurable, Cascadable Architecture" by H. Watanabe in IEEE Journal of Solid-State Circuits, Vol. 25, No. 2, April 1990.

The present invention relates to a novel controller architecture within the framework of the digital technology.

An object of the present invention is to provide a controller architecture, and a method of setting up the memory associated with the controller, which have such structural and functional features as to afford significant enhanced performance of digital controllers operated based on fuzzy logic with vectorial representation of the membership functions, thereby to overcome the drawbacks of prior art solutions.

SUMMARY OF THE INVENTION

The technical problems of the prior art are overcome by an architecture including an input section that comprises a plurality of fuzzyfiers arranged in parallel and being independent of one another, each fuzzyfier being provided with an analog input and a digital input as well as with digital outputs connected to the input side of a corresponding read-only memory in said central unit to select the address of a storage word.

The technical problem is also solved by a method of setting up the controller memory including the steps of storing the front preposition of a rule in a first memory addressing area and storing the rear implication portion in a second memory addressing area..

The features and advantages of an architecture according to this invention will become apparent from the following detailed description of an embodiment thereof, given by way of illustration and not of limitation with reference to the accompanying drawings.

DETAILED DESCRIPTION

Figure 1:
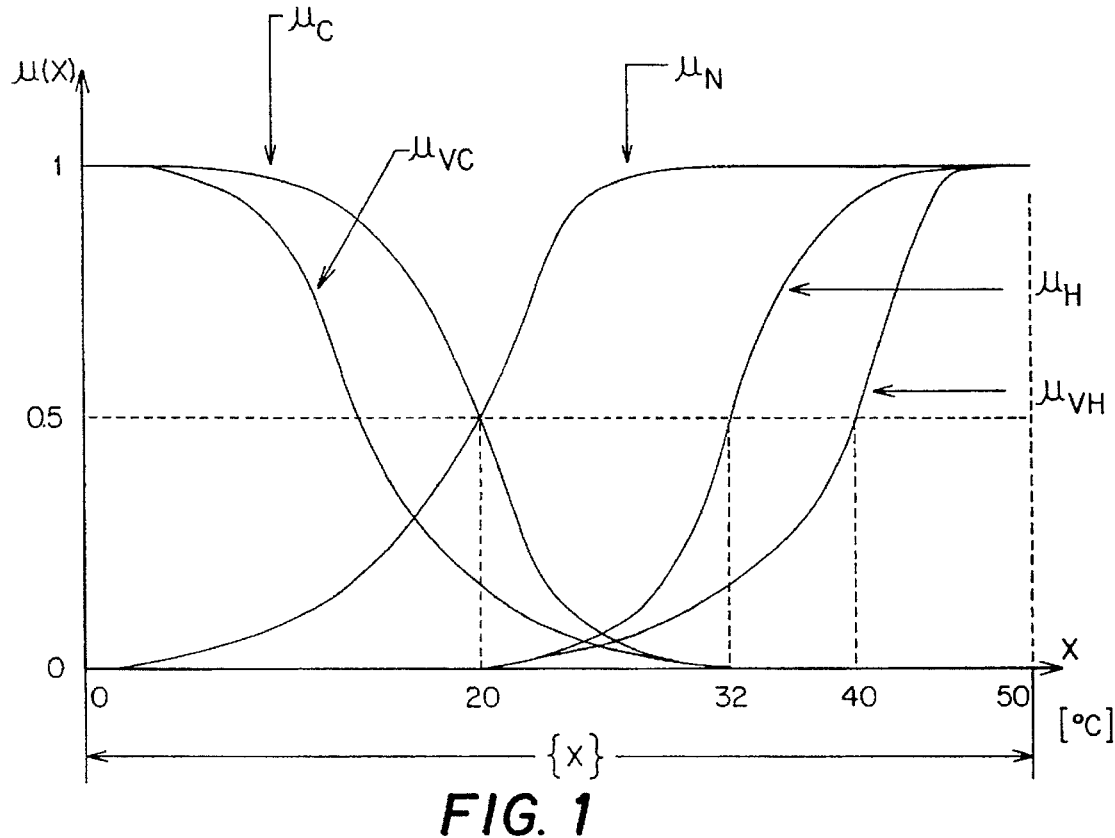
FIG. 1 is a graph diagramatically showing examples of membership functions of fuzzy logic variables.
Figure 2:
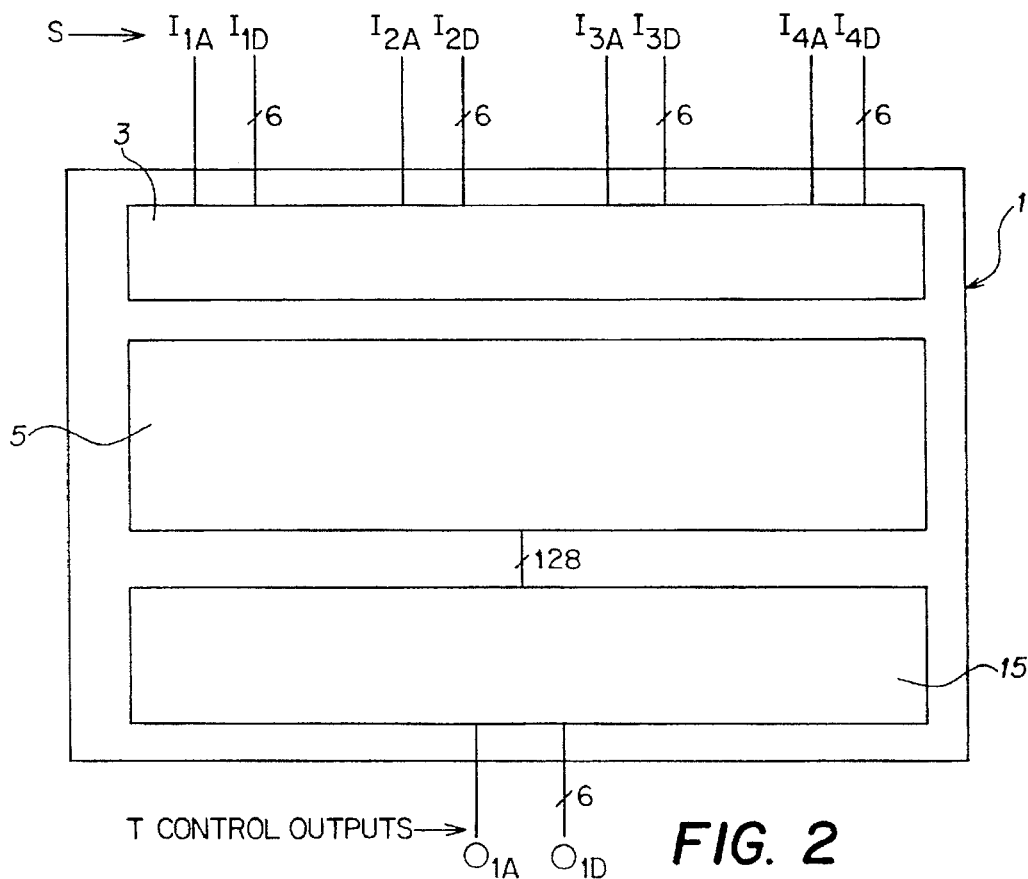
FIG. 2 is a schematic view of the architecture embodying the present invention.

Generally and schematically shown at 1 in the drawings is the architecture of an electronic controller embodying the present invention.

The controller 1 is structurally independent, being intended for closed loop operation as a stand-alone machine, and designed to operate in the fuzzy logic mode.

Controller 1 comprises a plurality S of analog inputs I1A, ..., ISA and a like number of digital inputs I1D, ..., ISD respectively coupled to the former.

Such inputs are intended to receive signals related to physical control variables, e.g. analog or digital signals from external sensors.

Figure 4:
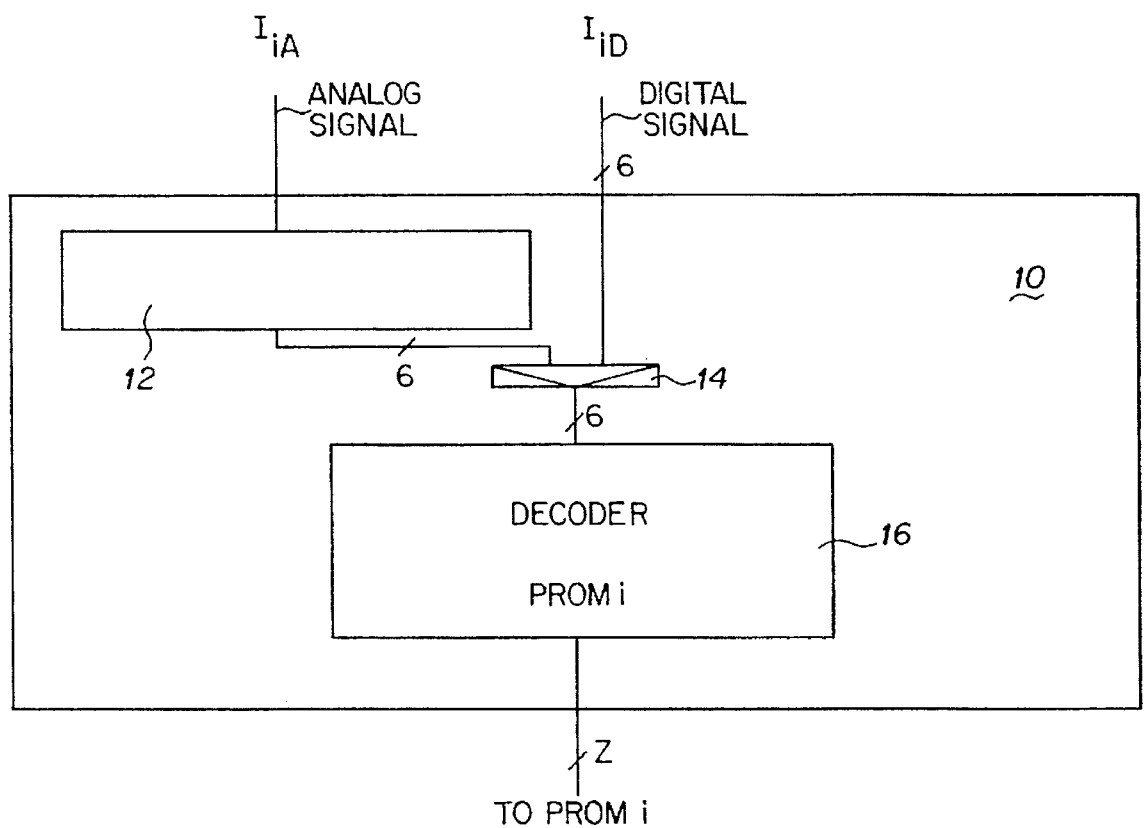
FIG. 4 is a schematic view of a detail of the device shown in FIG. 3.

Each generic and i-th input pair, IiA and IiD, is connected to a corresponding conversion device or fuzzyfier 10, shown in FIG. 4, which converts an input signal to logic information of the fuzzy type.

Figure 3:
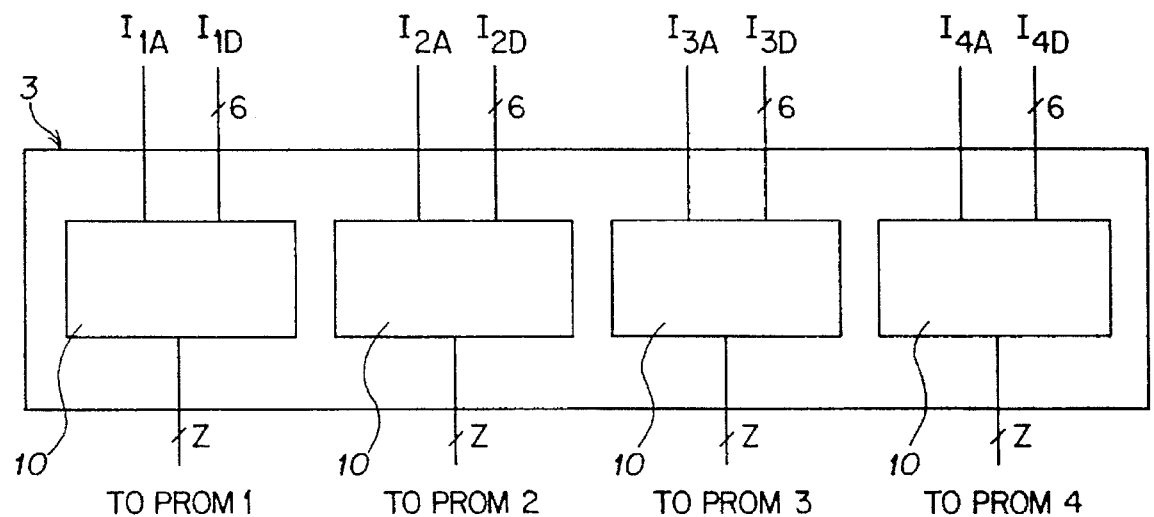
FIG. 3 is a schematic view of a particular device of the architecture depicted in FIG. 2.

The set of devices 10 constitute a conversion input section 3 of the controller 1 as shown in FIG. 3.

In a preferred embodiment, section 3 comprises four fuzzyfiers 10 which allow four control signals, whether analog or digital in nature, to be input at one time.

However, section 3 could accommodate a greater number of fuzzyfiers 10, depending upon the required interfacing with external circuitry.

The architecture 1 further comprises a central control unit or fuzzy controller core 5, wherein the fuzzy logic membership functions are stored and the fuzzy logic computation is performed.

Figure 5:
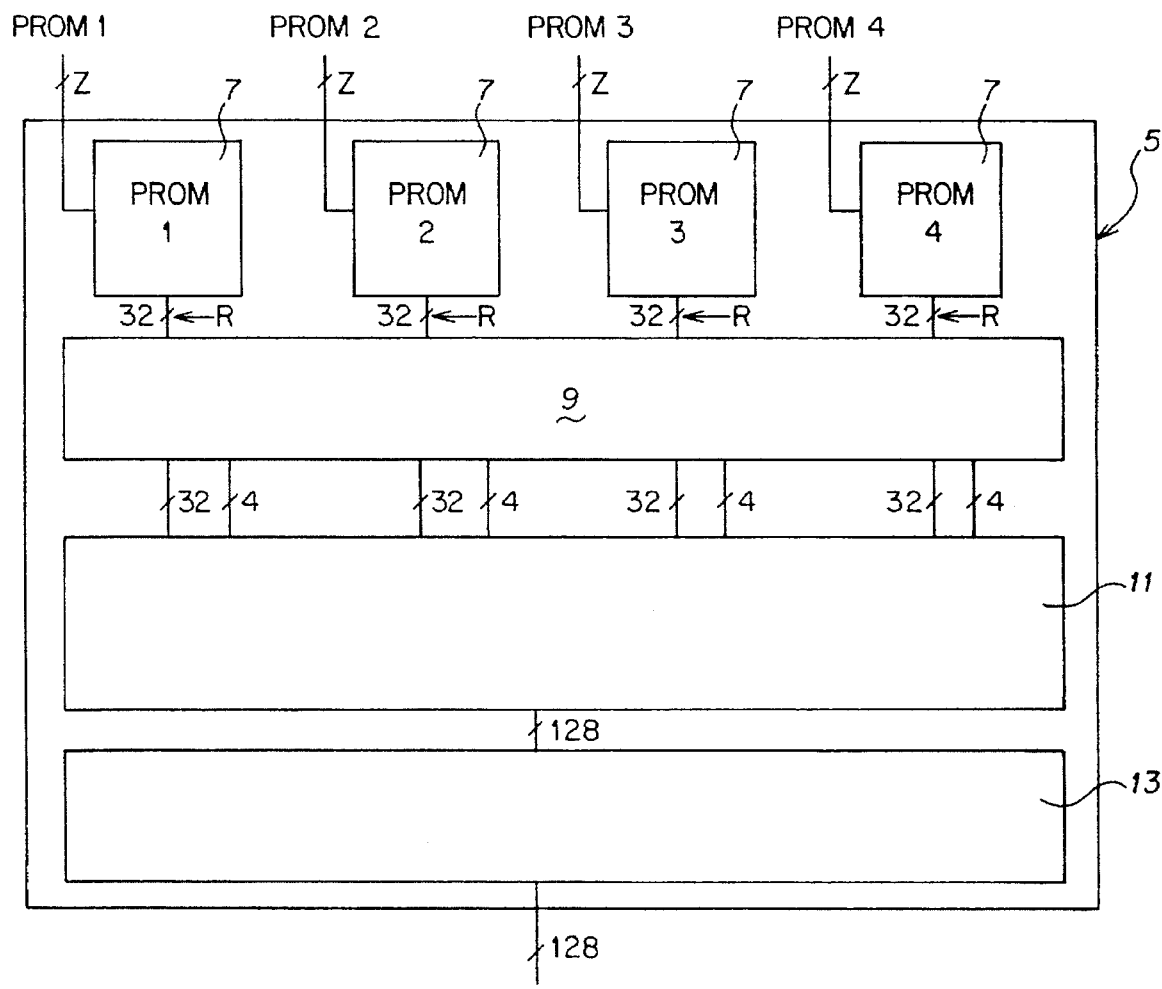
FIG. 5 is a schematic view of a central control unit incorporated into the architecture of FIG. 2.

A more detailed diagram of the unit 5 is shown in FIG. 5 and includes a plurality S of programmable read-only memories 7, e.g. of the PROM or EPROM types, each connected to one of the previously mentioned fuzzyfiers 10.

Each memory 7 is addresses by digital signals presented on a bundle or bus Z of conductors which connect an equal number of inputs of each memory 7 to respective outputs of each corresponding fuzzyfier 10.

Figure 9:
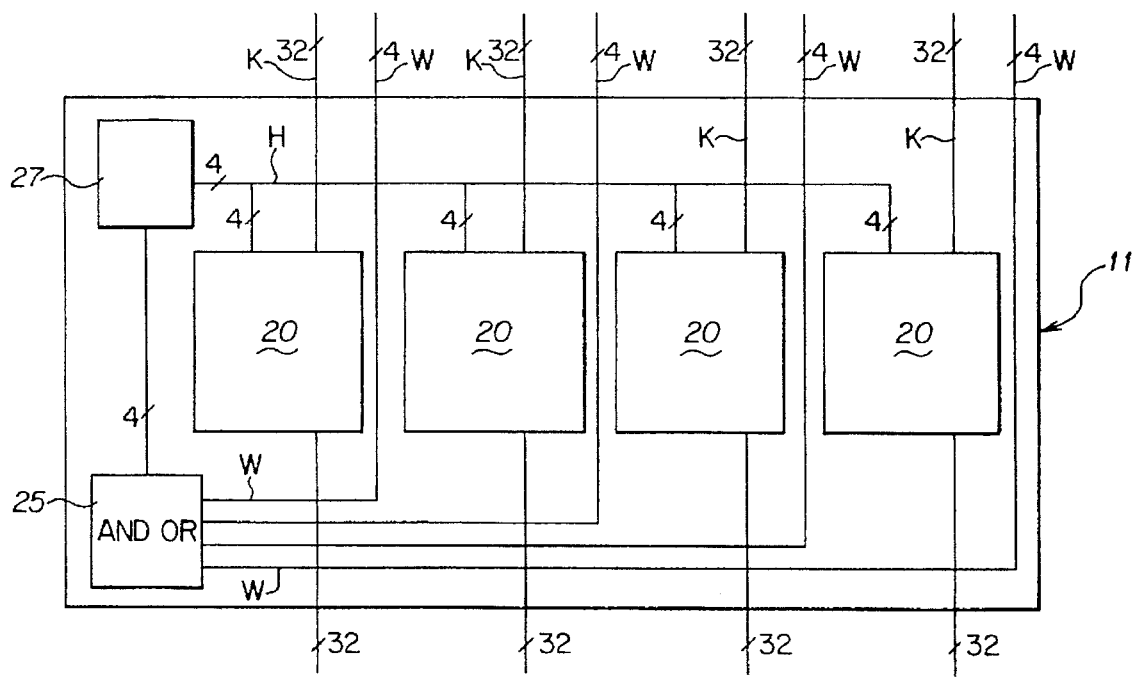
FIG. 9 shows schematically a control unit incorporated into the central unit of FIG. 5.

The memories 7 are selected to have a word length of thirty two bits, and each memory has thirty two outputs R connected directly to an interface circuit 9 which is further coupled to an inference control unit 11 to be described particularly in connection with FIG. 9.

The last-mentioned unit, 11, is connected bidirectionally to an assembler 13 of membership functions $\mu(x)$ whose outputs are also the outputs of the central unit 5.

The architecture 1 is completed by a converter and drive output section or defuzzyfier 15, which provides an appropriate interface between the controller 1 and the external circuitry to drive, for example, an actuator by converting fuzzy information to an analog $O_{IA}$ or digital $O_{ID}$ electric signal.

A number T of control outputs O1D,O1A, ... OTD,OTA are provided in this respect for both digital and analog signals. T has a preferred value of 1, meaning that there is a single set of control inputs.

The interior structure of a generic i-th fuzzyfier 10 will now be described in greater detail.

With reference to FIG. 4, it can be seen that analog input IiA belongs to a six-bit analog/digital converter 12 adapted to transform the analog signal applied thereto into a corresponding punctual value in space defining the aggregate of membership functions of a given fuzzy variable.

Advantageously, the architecture of controller 1 is defined using the assumption that a discrete vectorial representation is sought for the membership functions $\mu(x)$.

In this respect, the universe of discourse x1, ..., xN has been split into a number N=64 of segments, each capable of taking a value in the aggregate [1,2, ..., L] where L=16 represents a degree of membership.

Of course, the extremes of truth would be 0=untrue and 1=true.

This non-restrictive choice of the values of N and L has been suggested by the need for a trade off in accuracy of data representation versus computational efficiency both in terms of the number of electronic components and the time required to perform an inference operation.

The adoption of a representation domain N of the variables equal to 64 has also led to adopting a six-bit A/D converter having its output connected to one input of a multiplexer 14 provided with two inputs and an output.

Where the input signal from external circuitry is already in the form of a digital signal, then the digital input IiD will be substantially coincident with the other input of the multiplexer 14 having its output connected directly to the input side of a decoder block 16.

Thus, regardless of whether the signal input to the fuzzyfier 10 is an analog or digital type, the decoder block 16 receive a digital signal from the multiplexer 14 over a six-bit bus.

Decoder 16 is computes the word address of a memory 7 in which the $\alpha$ values related to a term set under consideration are stored.

The address of the generic $\alpha$ value is computed from the following formula:

Address of $\alpha$=[Base Value+(Input Value)*(Number of $\mu(x)$ Present in the Term Set)]/Size of Address Words Decoder 16 incorporates circuitry adapted to carry out this computation at a fast rate, such as an ALU (Arithmetic Logic Unit) or a dedicated logic circuit. The choice depends essentially on the target performance level.

The output of block 16 includes a series of Z bus connections which are connected to one of the memories 7.

Advantageously, according to the invention, the memories 7 are set up internally especially to contain the membership functions $\mu(x)$ for the fuzzy variables X on which the controller 1 is to act.

Having adopted a vectorial representation with N=64 and L=16, each membership function occupies 256 memory bits.

In order to maximize the parallelism level P of the machine, the global memory is divided into four structurally independent memories 7, each comprising a series U of thirty two bits.

The overall span of the storage modules is equal to the machine internal parallelism value P.

The greater the value P, the larger the number of the elements in the universe of discourse which can be computed in parallel.

For this architecture, a value of P=128 bits has been preferred, which allows operations to be carried out in parallel on thirty two elements of the universe of discourse.

The value of U is a number which accounts for the number of the membership functions $\mu(x)$ present in the aforesaid term set; this value of U is reflected in the number of address buses for the storage modules.

Splitting the memory into four discrete modules 7 allows the values of the membership functions related to four fuzzy variables X associated with the control inputs to be accessed simultaneously.

Accordingly, the number of the modules will be a function of the number of external variables which can be interacted with.

Figure 6:
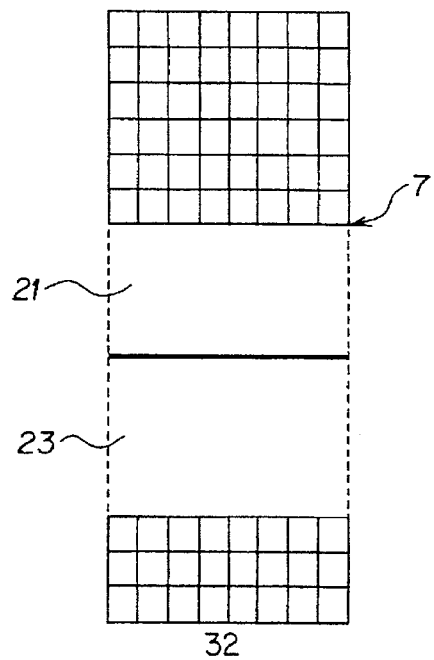
FIG. 6 is a schematic view of a storage module incorporated into the architecture of FIG. 2.

With reference to FIG. 6, it can be seen that each storage module 7 is divided in two portions 21 and 23, not necessarily having the same size.

The first portion, 21, represents an address area wherein a predetermined type of membership function can be stored, and the second portion, 23, is also an address area but storing other types of the membership function µ(x).

More particularly, when analyzed at a high level, fuzzy logic configures as a body of IF-THEN rules applied to the membership functions, such as Rule:
IF (A is A1) and (B is B1)
THEN (C is C1) and (D is D1), where A1, B1, . . . ,D1 are membership functions and the relating operands are in English.

That part of the rules which comes before THEN is referred to as "left" or front part, and that which comes after THEN is referred to as "right" or rear part of the rule.

Now, stored in the portion 21 of each memory 7 are just the membership functions in the left parts of the fuzzy rules, whereas the portion 23 stores the right parts of said rules.

This division has been adopted because the criteria for storage of the variables are quite different in the two cases, as explained hereinafter.

Figure 16:
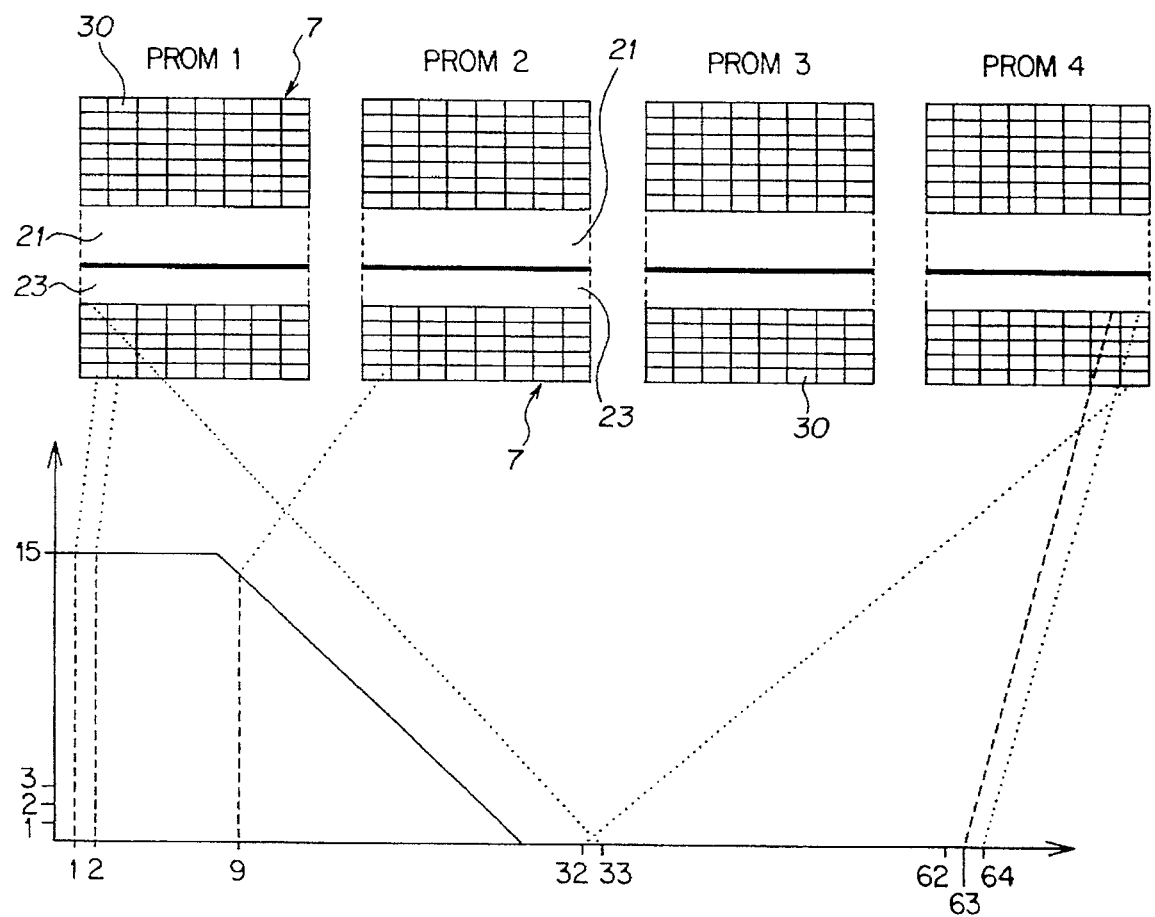
FIGS. 16 to 18 are respective diagrams illustrating the storage set-up in the central control unit shown in FIG. 5.

In the interest of a clearer appreciation of the kind of memory setup proposed by the invention, a simple example will be given now with reference to FIGS. 16 to 18.

Considering a simple term set which includes three membership functions µ(x), with a conventional method the information would be stored by writing sequentially the level of truth for each point of each membership function.

The functions would be allocated to contiguous memory locations.

The memory setting up method of the present invention works instead in a radically different way.

The elements of one term set carrying the same "i" subscript representing the i-th horizontal segment in the [1, . . . , N] universe of discourse, are stored consecutively.

Figure 17:
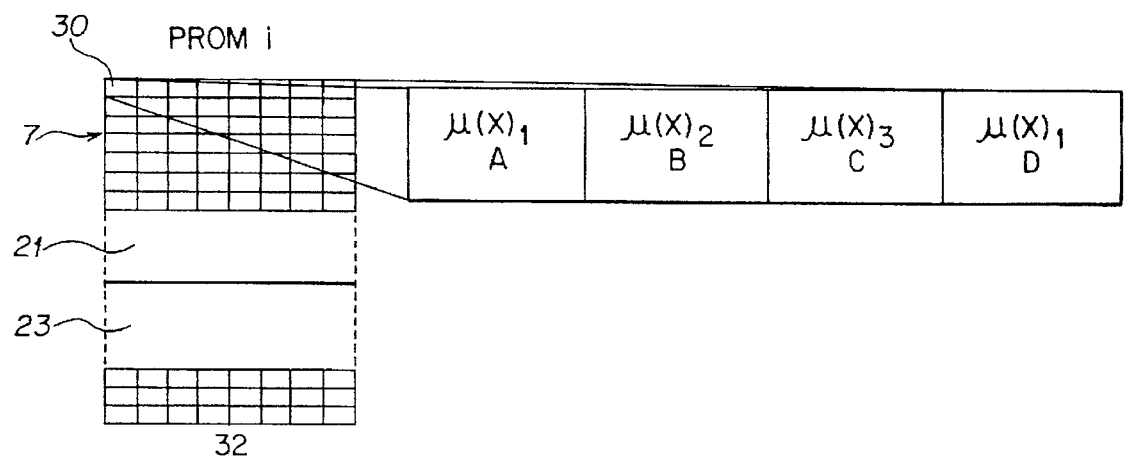
Figure 18:
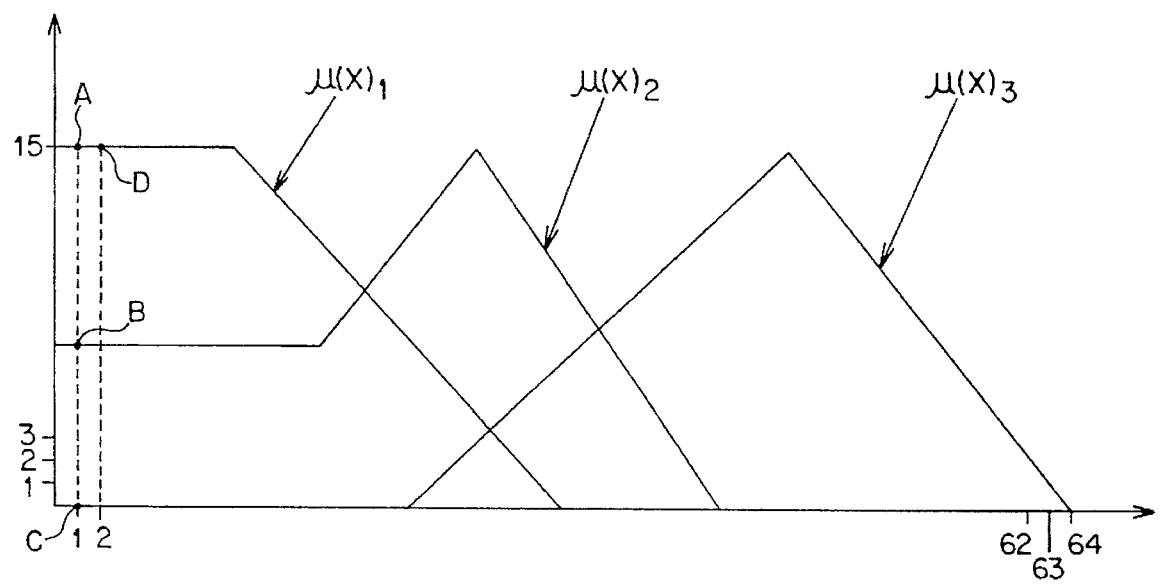

This situation is illustrated by FIGS. 18 and 17, the former showing a graph in which three membership functions $\mu(x)1$, $\mu(x)2$, $\mu(x)3$ have been plotted, and the values A, B, and C of these functions at the first point of the universe of discourse.

The latter FIG., 17, shows the sequence of cells 30 in a storage module 7 and the contents of such cells as the sequence of the i-th term set.

It should be noted here that among the applicable inference rules to the membership functions of fuzzy variables, a so-called weight function a can be defined which is indicative of how well the input prepositions of the "left" part of a rule match the membership functions.

In the instance of machines controlling physical quantities, such as those converting physical values from external sensors into fuzzy variables, the computation of weights α would be limited to finding the intercept of the input variable value on the membership functions of the term set.

Another particularly indicative weight function is defined by $\Omega=\min(\alpha iA, \alpha iB,...)$ and indicates the overall extent of likeness of the IF part of a rule.

Now, by virtue of the memory setup of this invention, as the value of a fuzzy variable is identified, it becomes possible to access all of the values α for that variable with a limited number of accesses to the memory 7 being a function of the number F of membership functions in the term set and of the size (thirty two bits) of the memory word.

In essence, the number of the accesses is given by a value rounded up to the nearest of F/8, where 8 represents the largest number of α values that can be stored with a word of thirty two bits.

Further, with this memory setup, all the values of α related to a variable occupy consecutive locations in the memory, and it will be sufficient to increment the address of cells 30 stepwise to successively read out the values of α for any given variable.

Let us consider now the method of storing membership functions pertaining to the "right" part of the rules.

In this case, it is important that the unit 11 be supplied in an efficient way with the fuzzy variables on which the inference operations are to be carried out.

For this purpose, having the memory divided in four discrete modules already allows the information contained therein to be accessed in an independent fashion.

However, if such modules are taken as one block, then the N four-bit elements representing a membership function will be split among all the memories in eight words of thirty two bits.

Accordingly, the first thirty two elements will be stored on four words which have the same address in the four modules 7.

The remaining thirty two elements will be on another four words.

The membership functions in the "right" part of the fuzzy rules will, therefore, have two storage addresses each, with each address identifying thirty two elements of four bits.

Figure 7:
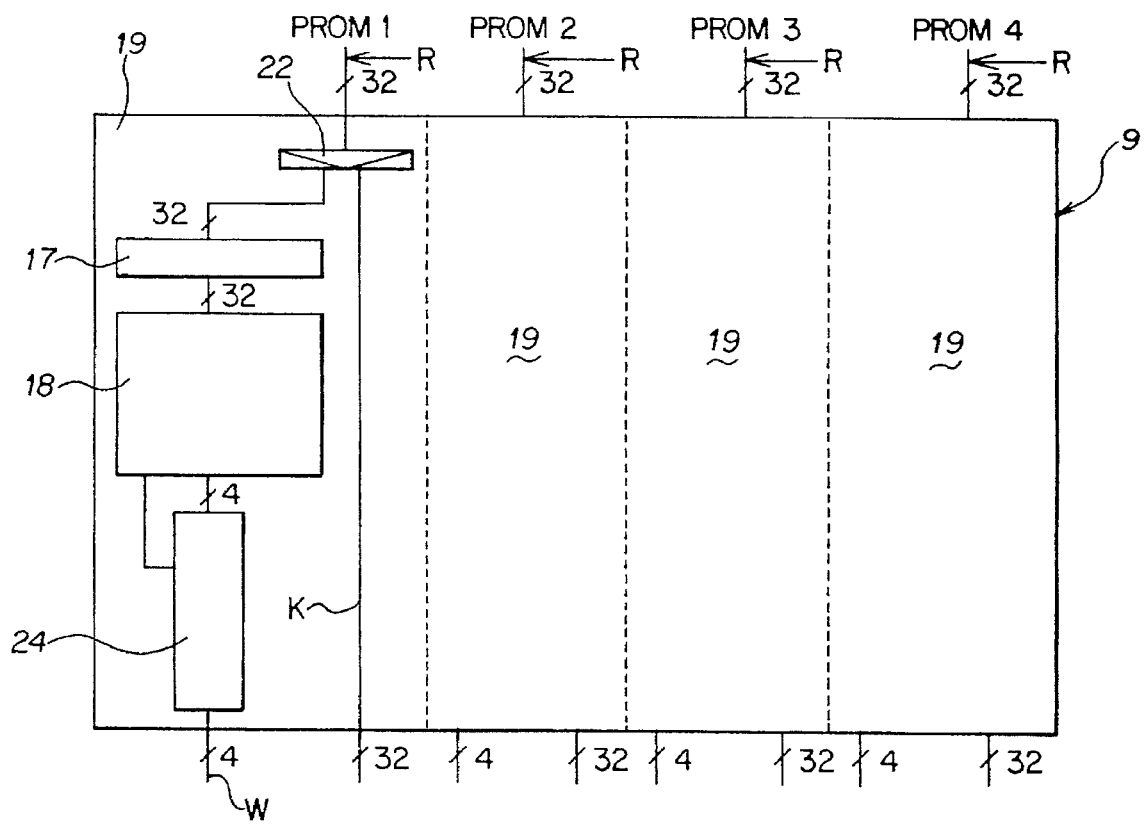
FIG. 7 is a schematic view of an interface circuit incorporated into the central unit of FIG. 5.

FIG. 7 is illustrative of this situation.

The two addresses where a membership function is stored need not be successive, but may be at locations judged to be efficient for computation purposes.

For instance, it would be more convenient to have the various halves of the membership functions stored in the same order in which they will be used, this order being always the same for a given control program.

Consequently, the address of the following storage location can be obtained by increasing the current location by one.

Referring now to FIG. 7, the internal structure of the interfacing circuit 9 will be described in detail, which circuit is to handle and convey information from the memories 7 to the inference control unit 11.

The circuit 9 is divided into a number of adapter circuits 19, which are identical with one another and equal in number to the memories 7.

Each adapter circuit 19 comprises an input multiplexer 22 having a bus input and dual bus outputs and being connected directly to the thirty two outputs R of a corresponding memory 7.

The mixer 22 deals in a different way with the signals input to the adapter circuit 19 according to the type of the information the signals contain.

Basically, since stored in the memories are the values of membership functions both from the right part and the left part of the fuzzy rules, the corresponding signals will be addressed directly or indirectly to the computation devices.

As an example, if the memory word is related to a function from the "right" part of the rule, then that word contains eight elements of the same membership function and is passed to the unit 11 over the bus link K.

On the other hand, where the memory word represents the "left" part, the word may contain from no less than 1 to no more than 8 values of α referring to the same fuzzy variable X.

To handle such values of α, a buffer register 17 is provided after the multiplexer 22, along with a read/write memory 24 of the RAM type which is accessed through a finite state machine 18 connected to an output of the register 17.

The size of the RAM will depend on the largest number of membership functions present in the term set, sixteen in this case.

Figure 8:
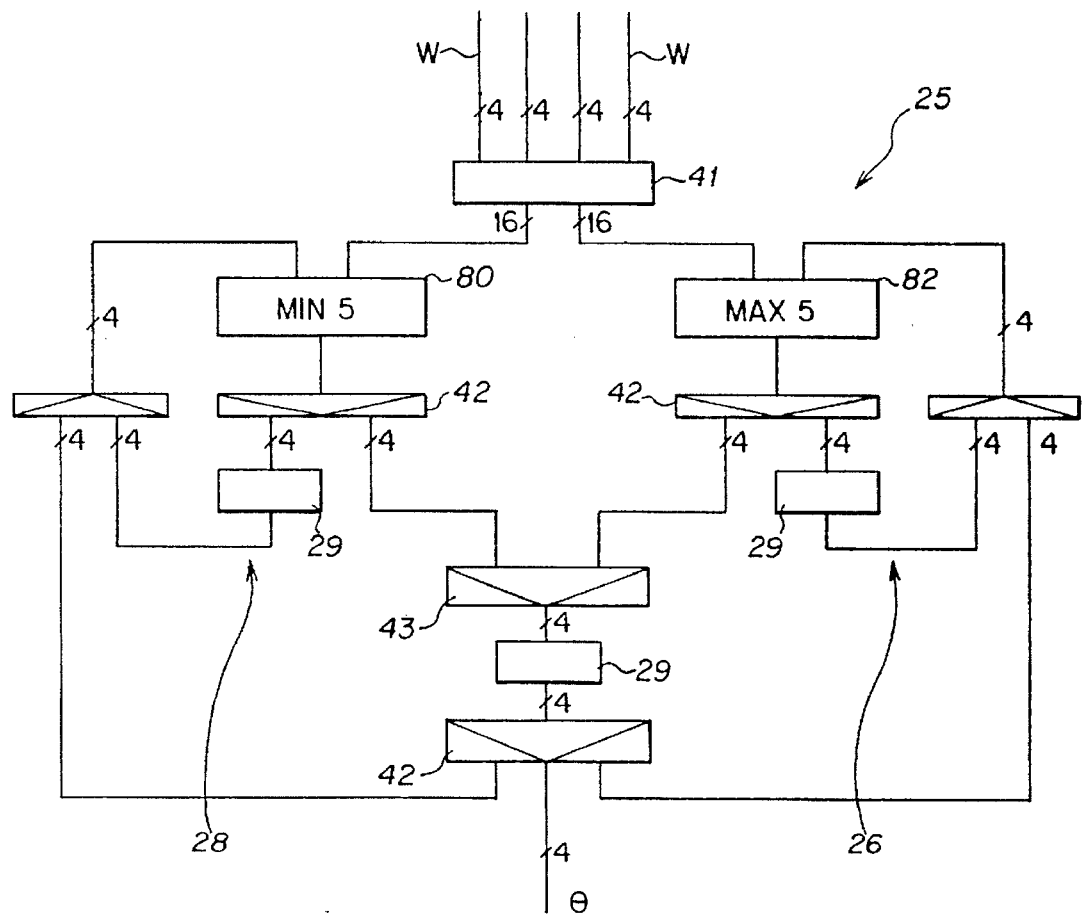
FIGS. 8 and 10 are respective schematic views of details of the control unit shown in FIG. 9.

Four bus leads W are provided out of the RAM 24 which are all connected to the input side of an AND-OR selector 25 incorporated to the control unit 11, as shown in FIGS. 8 and 9.

The unit 11 represents the core of the controller 1, and it carries out the computation for the value of θ pertaining to each fuzzy rule.

The general layout of said unit comprises a set of four inference processors 20, being each input the bus K from adapter circuit 19.

Also provided are the AND-OR selector 25 and a level memory 27 of the RAM type.

The AND-OR selector 25 is designed to compute the value θ of a given inference rule, once the values αi associated with a function μ(x) are known.

In detail, the architecture of the selector 25 is shown in FIG. 8 and comprises two symmetrical portions 26, 28 intended for computing prepositions having logic OR and AND operands, respectively.

The input of said selector 25 is connected the buses W from the memories 24 which memories contain the values of α for a given rule.

Dependent on the types of the logic operands contained in a rule, the values of α are forwarded over a multiplexer 41 either into the MIN 80 or the MAX 82 block.

Figure 11:
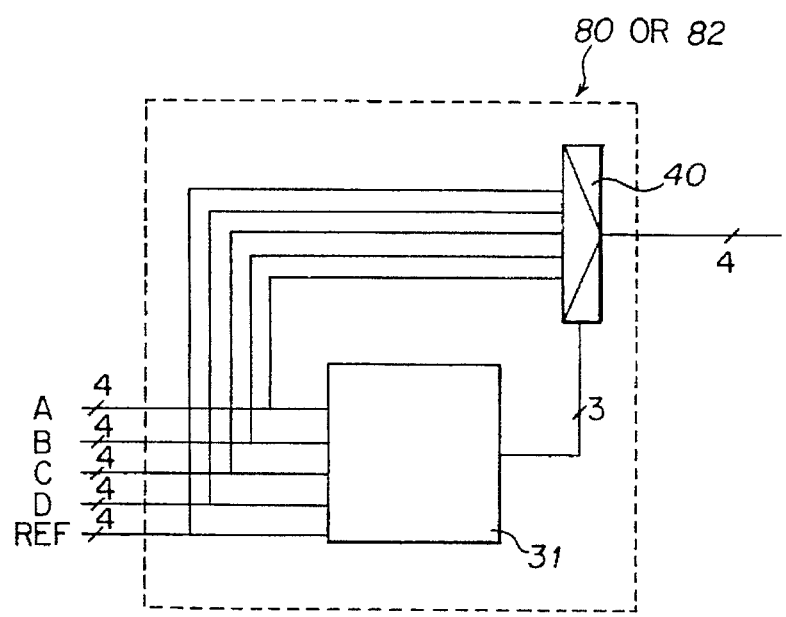
FIGS. 11 and 12 are respective schematic views of details of the control unit shown in FIG. 5.

The structure of a single MIN or MAX block is depicted in FIG. 11 and includes a comparator 31 having a plurality of inputs on which the values of α are received from memories 24 and a single output on which either the minimum or maximum of the input values is presented.

The comparator 31 output is addressed to a mixer 40 to which the signals applied to the comparator input are also directed by appropriate connections.

The great simplicity of this computational approach is attributable to the fact that only simple comparison operations are carried out between quantities.

This affords considerable savings in computing time as well as in electronic components.

Within the selector 25, the provision of some buffer registers 29 and various mixers 42 and 43 makes a local memory available for carrying out feedback computing operations by utilizing the partial results of previous operations.

The selector output carries the value of a rule, and is the outcome of a combination of various weight functions obtained through a suitable control program compiled on the basis of the fuzzy rule definition for a given application.

The value θ is stored in the memory 27 connected to the output of the selector 25.

Said memory 27 is to contain all the values θ resulting from computation of the "left" parts of all the rules which will be useful to modify the membership functions from the "right" parts of the rules in the course of the second step of the inferential process.

The memory 27 has a four-bit output connected, via a bus H, to corresponding inputs of each processor 20.

Figure 10:
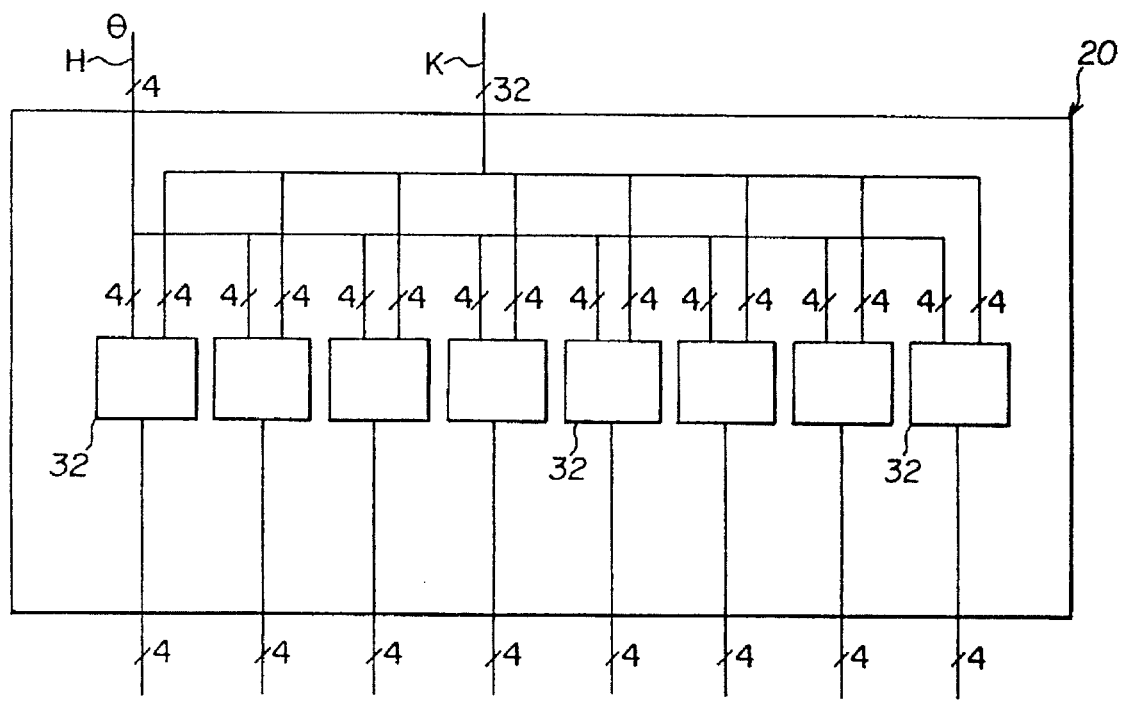
Figure 12:
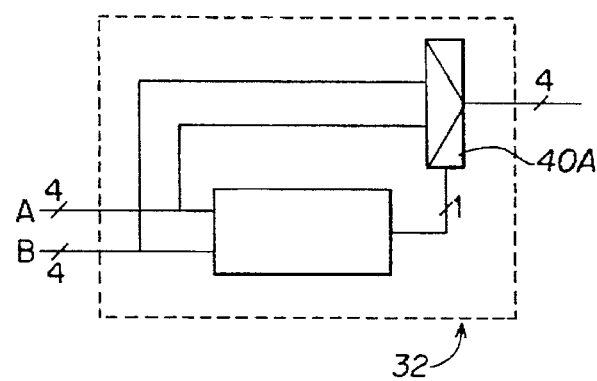

An individual processor 20 comprises a set of eight minimum comparator blocks 32 (FIG. 10), each illustrated in greater detail by FIG. 12, and is designed to output the lowest value of those presented on its two inputs.

These parallel-laid blocks 32 represent the computation element whereby the membership functions from the "right" part of the fuzzy rules are truncated.

The value θ stored in the level memory 27 defines the truncating value.

This truncating action is applied by comparing the value of each individual function component to the threshold value θ from the memory 27; each selector block 32 selecting the smaller of the two.

Figure 13:
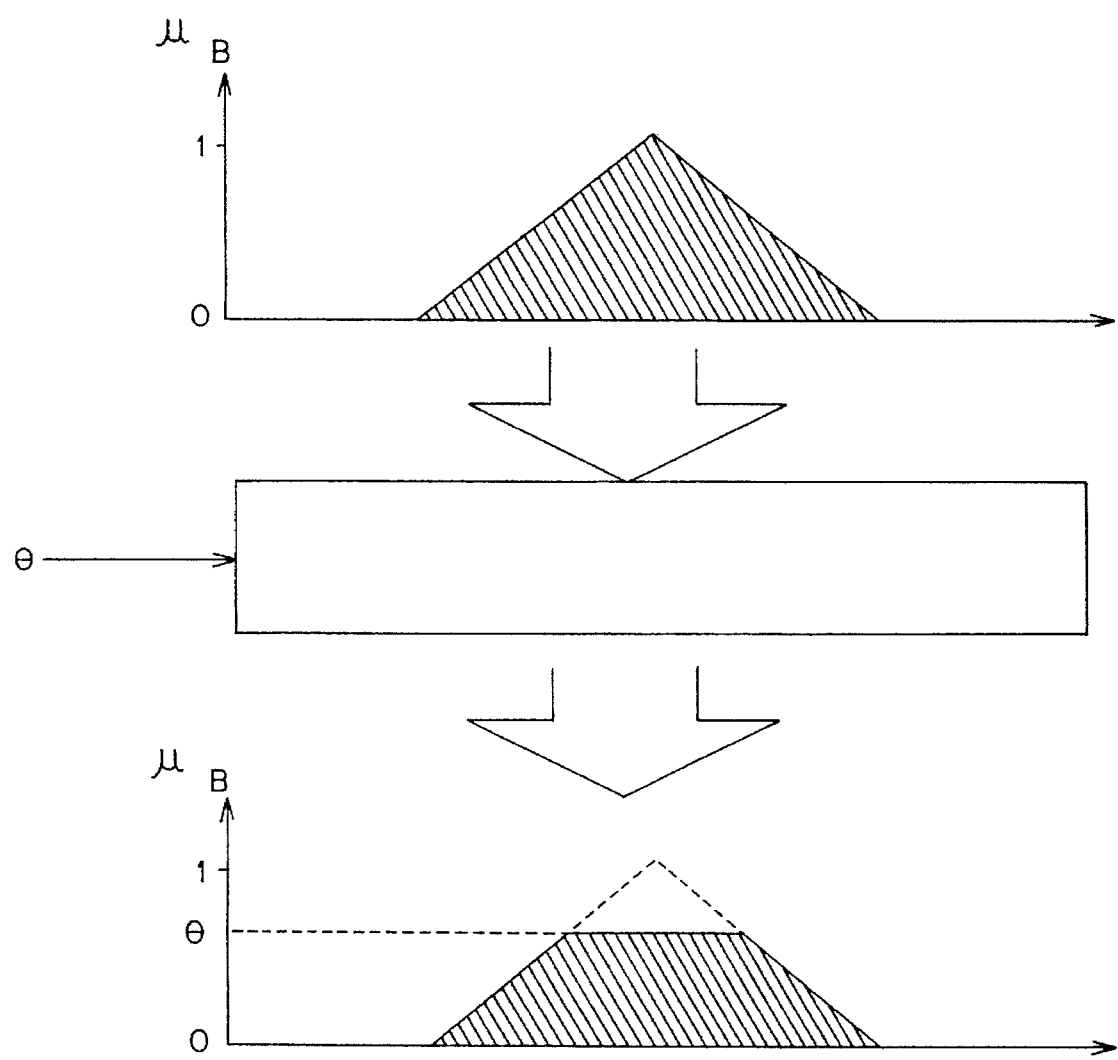
FIG. 13 shows a graph representing a logic operation as performed using the apparatus of the present invention.

FIG. 13 shows graphically this operation in simplified form.

Figure 14:
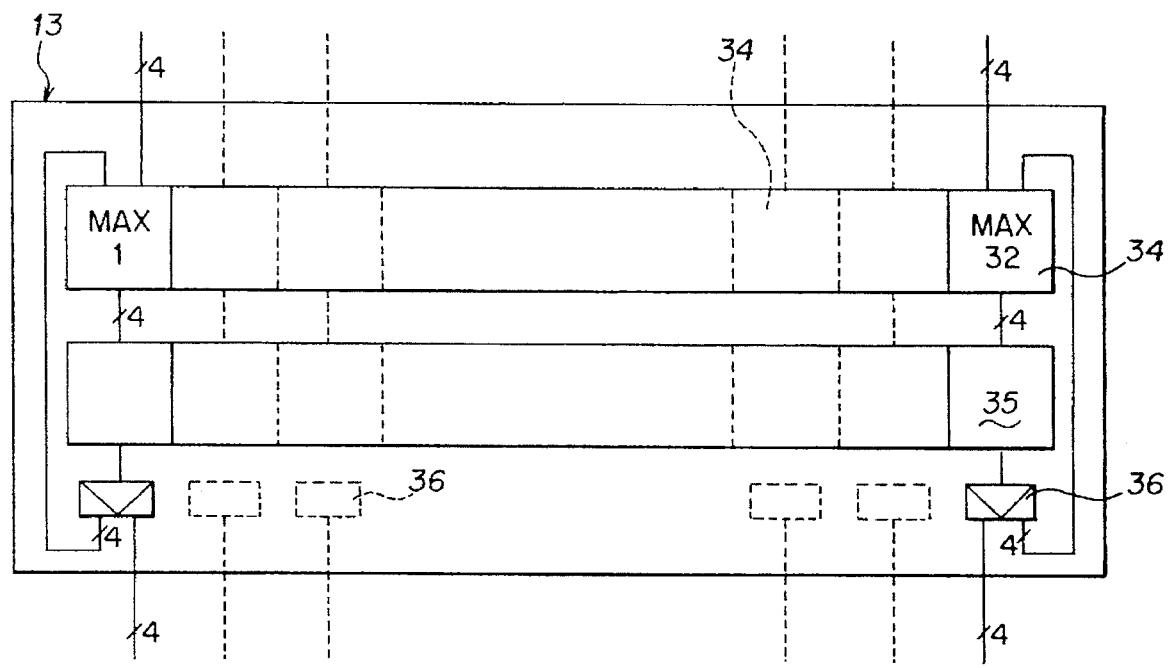
FIG. 14 is a schematic view of a function assembler device incorporated into the architecture of FIG. 2.

The architecture of this invention is completed by the membership function assembler 13 shown in FIG. 14.

In the membership function assembler, the membership functions are merged together in accordance with the computational model of the fuzzy logic to output the control signals, following appropriate conversion of same.

The merging operation consists of comparing together the various membership functions that are to make up the ultimate membership function.

Of the components of such functions carrying the same subscript, the one having a higher level of truth is selected.

For this purpose, the assembler 13 includes a series of thirty two maximum comparator blocks 34, being each input a four-bit signal from the unit 11.

The outputs, also of four bits, of each block 34 are respectively connected to respective buffer registers 35 which form, in combination, a one hundred and twenty eight-bit buffer structure.

Each register 35 has its output connected to the input of a two-output multiplexer 36, one output of which is feedback-connected to its corresponding comparator block 34.

Thus, the assembler 13 receives as its input the thirty two components of a membership function and performs, for each of them, a comparison with the value previously computed and stored in the buffer block 35.

In effecting the first comparison, the comparative value of 0000 is used.

The multiplexer 36 on the output side operates to direct the output from the buffer 35 either into the corresponding comparator 34 for a fresh loop, or to the defuzzyfier section 15.

It should be noted that the merging operation is carried out by dividing the membership function in two discrete halves, and the computation of one of these is completed before the computation for the other half is started.

This is made possible by the fact that the individual components of a function are computed independently.

Figure 15:
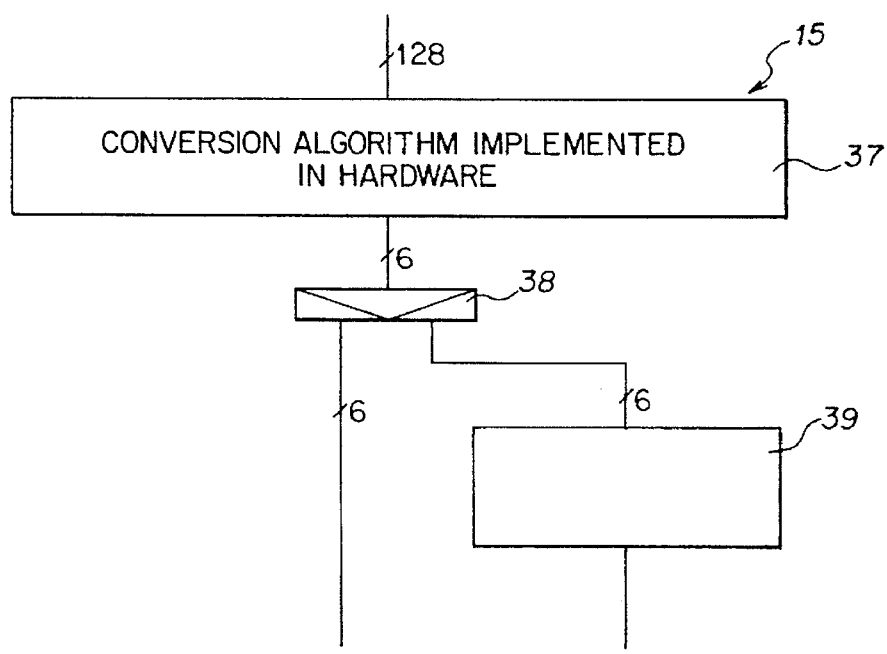
FIG. 15 is a schematic view of a detail of the architecture shown in FIG. 2.

For completeness of illustration, the structure of the defuzzyfier section 15 shown in FIG. 15 will now be discussed.

This section receives as its input the one hundred and twenty eight-bit signal representing the thirty two segments of the membership function.

A suitable conversion algorithm, contained in the block 37, converts the membership functions to punctual representations within the universe of discourse.

This means in practice that a six-bit signal will be obtained whereby a digital actuator can possibly be driven.

Through a multiplexer 38, that signal is also supplied to a digital/analog converter 39 to thereby have the same information available in analog form.

Thus, the section 15 provides a suitable interface between the controller 1 and external circuitry, as it would be impossible to drive an actuator directly by fuzzy logic information because the apparatus would be unable to respond to the data.

The controller architecture of this invention solves the technical problem and distinguishes itself from prior solutions in that it can simplify most of the computational work involved in inference operations.

Additionally, the particular storage organization affords significantly improved overall performance, which may even be one order higher than that of other designs.

The controller architecture according to the invention also eliminates the computational overhead that limits prior art controllers, to enable problems to be addressed in real time which could not be solved effectively by conventional methods.

Having thus described one particular embodiment of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended as limiting. The invention is limited only as defined in the following claims and the equivalents thereto.

What is claimed is:

1. A method of operating a memory for a fuzzy logic electronic controller, comprising the steps of:

subjecting predetermined membership functions of logic variables to interference operations configured as IF-THEN rules including at least one front preposition portion and at least one rear implication portion;

storing the front preposition portion in a first memory addressing area;

storing the rear implication portion in a second memory addressing area;

storing levels for a set of membership functions corresponding to a discrete value of a predetermined logic variable at consecutive locations in the memory; and providing sets of membership functions from the front preposition portion of the rules with two memory addresses each.

2. The method of claim 1, further comprising the step of providing vectorial representation having a first plurality of levels over a universe of discourse having a second plurality of values for each membership function in the set of membership functions.

3. The method of claim 1, further comprising the step of splitting the memory into plural structurally independent modules so that values of sets of the membership functions which relate to a similar plurality of variables can be accessed simultaneously.

4. A method for storing membership functions in a fuzzy logic controller comprising the steps of:

separating each membership function in a set of membership functions representing a logic variable into a first plurality of values;

storing a level of each membership function in said set of membership functions corresponding to one of said first plurality of values in consecutive memory locations;

storing levels for said set of membership functions corresponding to consecutive values in consecutive memory locations; and determining a location of a level of each membership function in said set of membership functions based upon an input value for said logic variable, wherein the location is determined by calculating an address based upon the input value for said logic variable.

5. The method of claim 4, further comprising the steps of:

storing levels of membership functions for different sets of membership functions in independent memory modules, and simultaneously accessing said different sets of membership functions.

6. The method of claim 4, further comprising the step of:

storing levels of a membership function in at least a second set of membership functions at consecutive locations.

7. The method of claim 6, wherein membership functions corresponding to a front preposition portion of a rule are stored so that levels for each membership function in a set of membership functions corresponding to a logic variable value are in consecutive locations, and membership functions corresponding to a rear implication portion of said rule are stored so that levels for a single membership function are in consecutive locations.

* * * * *